3,299,146
PREPARATION OF DIMETHYL DISULFIDE

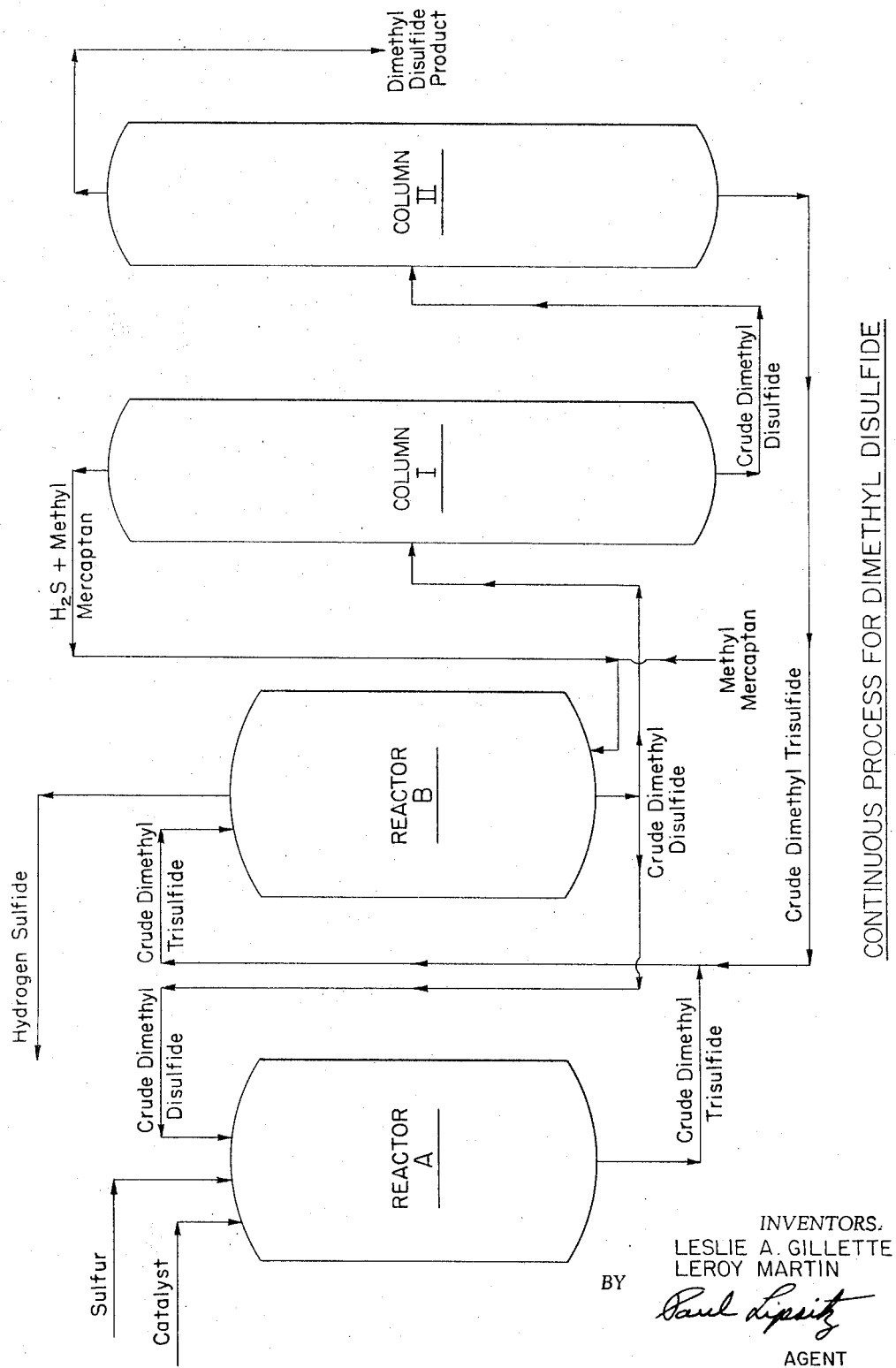

Leslie A. Gillette, Wayne, Pa., and Le Roy Martin, Riverview, Mich., assignors to Pennsalt Chemicals Corporation, Philadelphia, Pa., a corporation of Pennsylvania
Filed Mar. 26, 1964, Ser. No. 354,977
4 Claims. (Cl. 260—608)

This invention relates to the preparation of dimethyl disulfide by reaction of methyl mercaptan with dimethyl trisulfide.

It is known in the art, particularly U.S. Patent 2,237,625, that aliphatic mercaptans such as ethyl mercaptan and higher alkyl mercaptans may be sulfurized to di, tri and higher polysulfides by reacting sulfur with the mercaptan in the presence of an alkaline catalyst. In this prior art process, the aliphatic mercaptan and sulfur are slurried together in the presence of the catalyst, usually an aliphatic amine, and the reaction mass is heated to effect reaction, heating being continued until $H_2S$ is no longer evolved. While such a process is suitable and adequate for sulfurizing ethyl mercaptan and the higher boiling mercaptans, it is not suitable with methyl mercaptan because pressurized and refrigerated equipment would be necessary to avoid the loss of the methyl mercaptan which would be evolved with the $H_2S$.

It has now been found that dimethyl disulfide may be made in an efficient, continuous or batch procedure without the need for refrigerated or pressured equipment, and the dimethyl disulfide product may be obtained in good yield and conversion. In accord with this invention, methyl mercaptan is reacted with dimethyl trisulfide in the presence of a basic catalyst preferably selected from the group of metal oxides, metal hydroxides, and tertiary aliphatic amines. Activation of the basic amine catalyst, while not essential, is desirable and may be accomplished by addition of $H_2S$ to the system, or where mercaptan and sulfur are present in a basic system, $H_2S$ will be generated in situ due to the slow oxidation of the mercaptan.

In the process of the invention, dimethyl trisulfide and methyl mercaptan are reacted in essentially stoichiometric amounts. Dimethyl trisulfide is added to a reaction vessel and the catalyst, preferably a tertiary lower alkylamine such as triethylamine, is added. Methyl mercaptan oxidizes slowly in presence of an alkaline catalyst and sulfur thereby liberating hydrogen sulfide. Therefore, the methyl mercaptan is added slowly until the catalyst is activated. Then, the methyl mercaptan is added over a period of time with mild evolution of $H_2S$ gas until the addition is complete. The reaction mass is heated to a temperature of about 100–110° C. to eliminate the volatile materials which are present, mainly $H_2S$ and traces of unreacted methyl mercaptan.

An alternative procedure illustrated by the drawing is particularly suited for continuous production of dimethyl disulfide. In this procedure the dimethyl trisulfide is prepared in situ from sulfur and dimethyl disulfide. In such a procedure, dimethyl disulfide and sulfur are reacted in Reactor A in the presence of an amine such as triethylamine activated as above described and a clear red solution forms which is essentially all dimethyl trisulfide. The dimethyl trisulfide solution which contains the catalyst is continuously withdrawn and added to a second reactor, Reactor B. Methyl mercaptan is continuously added preferably counter-currently as shown at the bottom of Reactor B and one mol of the trisulfide is converted to two mols of disulfide, with liberation of $H_2S$. One half of the crude dimethyl disulfide is transferred to Reactor A for conversion to the trisulfide with sulfur. The other half of the dimethyl disulfide passes into a distillation section (Column I) for removal of residual hydrogen sulfide and unreacted methyl mercaptan, which is added to the methyl mercaptan feed stream. This devolatized crude dimethyl disulfide is passed into a rectifying column (Column II) and the pure dimethyl disulfide is taken overhead. The bottoms product, dimethyl trisulfide, is passed to Reactor B where, in contact with methyl mercaptan, it is converted to dimethyl disulfide.

The stoichiometry of the process is in accord with the following equations:

$$CH_3—S_2—CH_3 + S \rightarrow CH_3—S_3—CH_3$$
$$CH_3—S_3—CH_3 + 2CH_3SH \rightarrow 2CH_3—S_2—CH_3 + H_2S$$

It is obvious that one mole of dimethyl disulfide starting material yields two moles of dimethyl disulfide as end product. This the process of this invention is, in effect, a novel sulfurization of methyl mercaptan with sulfur to obtain dimethyl disulfide.

The catalysts for the reaction are, as indicated, basic in nature and will be selected from a group consisting of alkali metal hydroxides (e.g. NaOH, KOH, etc.) alkaline earth metal oxides and hydroxides (e.g. CaO, $Ca(OH)_2$, $Ba(OH)_2$, etc.) or aliphatic amines. The preferred catalysts will be aliphatic amines such as dimethyl, trimethyl or triethyl amines, but other amines may be used, such as tripropylamine, tributylamine and the like.

The invention is further illustrated by the following examples:

Example I

Four moles (505 g.) of dimethyl trisulfide was charged to a reaction flask together with 0.4 ml. of triethylamine as catalyst. Eight moles (384 g.) of methyl mercaptan was gradually introduced over a period of 1.75 hours and the reaction proceeded with mild evolution of $H_2S$ gas. The reaction mass was then heated to about 110° C. to eliminate most of the residual volatiles, mainly $H_2S$ and unreacted methyl mercaptan.

The crude product of dimethyl disulfide amounted to 717 g. and analyzed as 80% dimethyl disulfide and 20% dimethyl trisulfide by vapor phase chromatography which corresponds to a conversion to dimethyl disulfide of 85% based on methyl mercaptan.

Example II

Dimethyl trisulfide was prepared in situ by charging four moles of dimethyl disulfide and four moles of sulfur into a one liter reaction flask together with 0.3 ml. triethylamine as catalyst. Then methyl mercaptan was bubbled in and when the first few bubbles were added the reaction mass changed from a yellow slurry to a clear red solution, which solution comprised at this point some sulfur dissolved in 20% dimethyl disulfide and 80% dimethyl trisulfide. Methyl mercaptan addition was continued and the reaction was followed by vapor phase chromatography until the reaction mass attained 90% dimethyl disulfide and 10% dimethyl trisulfide. A slight excess of methyl mercaptan was added and the mass was then heated to 80–93° C. to expel $H_2S$, free methyl mercaptan and the catalyst. Distillation of a crude product gave material which analyzed 90% dimethyl disulfide and 10% dimethyl trisulfide.

It will be understood that numerous changes and variations may be made from the above description and examples without departing from the spirit and scope of the invention.

We claim:
1. A process for preparing dimethyl disulfide which comprises reacting methyl mercaptan with dimethyl trisulfide in the presence of a basic catalyst selected from the group consisting of alkali metal hydroxides, alkaline earth metal oxides and hydroxides, and tertiary aliphatic amines and after reaction is complete removing the volatile by-product.

2. A process for preparing dimethyl disulfide which comprises reacting essentially two moles of methyl mercaptan with one mole of dimethyl trisulfide in the presence of a tertiary lower alkyl amine catalyst, and after reaction is complete removing the volatile by-products.

3. A continuous process for the preparation of dimethyl disulfide which comprises sulfurizing dimethyl disulfide with sulfur to prepare dimethyl trisulfide, adding methyl mercaptan to said dimethyl trisulfide, said addition being made in the presence of a tertiary lower alkyl amine as catalyst, sulfurizing a portion of the dimethyl disulfide so formed to form additional dimethyl trisulfide, and distilling volatile by-products from the balance of the dimethyl disulfide product.

4. A process as in claim 3 wherein the catalyst is triethylamine.

No references cited.

CHARLES B. PARKER, *Primary Examiner.*

D. R. PHILLIPS, *Assistant Examiner.*